US008668206B2

(12) United States Patent  (10) Patent No.: US 8,668,206 B2
Ball                       (45) Date of Patent:     Mar. 11, 2014

(54) FACE SEAL GASKET

(75) Inventor: Marty Scott Ball, Jonesville, NC (US)

(73) Assignee: Mueller International, LLC, Atlanta, GA (US)

( * ) Notice: Subject to any disclaimer, the term of this patent is extended or adjusted under 35 U.S.C. 154(b) by 463 days.

(21) Appl. No.: 12/813,925

(22) Filed: Jun. 11, 2010

(65) Prior Publication Data

US 2011/0005333 A1  Jan. 13, 2011

Related U.S. Application Data

(60) Provisional application No. 61/186,198, filed on Jun. 11, 2009.

(51) Int. Cl.
    *F16J 15/06* (2006.01)
(52) U.S. Cl.
    USPC .......................................... 277/637; 277/630
(58) Field of Classification Search
    USPC .......................................... 277/630, 637, 649
    See application file for complete search history.

(56) References Cited

U.S. PATENT DOCUMENTS

| 1,372,178 | A   |   | 3/1921  | Loving |
| 1,966,015 | A   |   | 7/1934  | Kuzovenkoff |
| 2,128,429 | A   |   | 8/1938  | Olson |
| 2,260,612 | A * | 10/1941 | Fall ............................. 277/465 |
| 3,108,818 | A * | 10/1963 | Furstenburg .................. 277/637 |
| 3,469,852 | A * | 9/1969  | Smyk et al. ................... 277/623 |
| 3,689,083 | A * | 9/1972  | Greenawalt .................... 277/372 |
| 4,002,344 | A   | 1/1977  | Smith |
| 4,088,327 | A * | 5/1978  | Bachle ......................... 277/637 |
| 4,236,736 | A * | 12/1980 | Anderson ..................... 285/125.1 |
| 4,553,587 | A * | 11/1985 | Traylor .......................... 165/95 |
| 4,815,747 | A * | 3/1989  | Wolford ........................ 277/306 |
| 5,203,477 | A * | 4/1993  | Lo ............................ 222/153.01 |
| 5,450,783 | A   | 9/1995  | Binford |
| 5,525,226 | A * | 6/1996  | Brown et al. .................. 277/641 |
| 5,720,328 | A * | 2/1998  | Ott ................................ 141/312 |
| 5,904,357 | A * | 5/1999  | Demirdogen et al. ......... 277/630 |
| 5,967,674 | A   | 10/1999 | Reubelt et al. |
| 5,996,810 | A * | 12/1999 | Bounnakhom et al. ....... 210/443 |
| 6,035,906 | A * | 3/2000  | Ott ................................ 141/312 |
| 6,045,693 | A * | 4/2000  | Miller et al. .................. 210/248 |
| 6,167,963 | B1* | 1/2001  | McMahan et al. ............ 166/179 |
| 6,446,826 | B1* | 9/2002  | Foltz et al. .................... 220/86.2 |
| 6,467,853 | B1  | 10/2002 | Swartzendruber et al. |
| 6,533,461 | B2  | 3/2003  | Gottlieb |
| 6,851,726 | B2* | 2/2005  | Minemyer ..................... 285/322 |
| 7,000,995 | B2  | 2/2006  | Hagelthorn |
| 7,219,940 | B2  | 5/2007  | Huang |
| 7,424,909 | B2* | 9/2008  | Roberts et al. ................ 166/118 |
| 7,827,987 | B2* | 11/2010 | Woodard et al. .......... 128/204.18 |
| 8,033,549 | B2* | 10/2011 | Huang ........................... 277/366 |
| 2005/0025604 | A1 | 2/2005 | Slesinski et al. |
| 2005/0077685 | A1* | 4/2005 | Roddis et al. ................. 277/390 |

* cited by examiner

*Primary Examiner* — Gilbert Lee
(74) *Attorney, Agent, or Firm* — Taylor English Duma, LLP

(57) ABSTRACT

Various embodiments of the present invention provide improved face seal gaskets for use in connecting meters and other devices to pipelines. The improved face seal gaskets include a planar annular ring portion and one or more tabs extending substantially perpendicularly from the annular ring portion. In use, the annular ring portion is disposed adjacent a sealing surface on the inlet or outlet of the device to facilitate a fluid tight connection between the device and the pipeline. The tabs engage complementary grooves formed in the inlet or outlet portions of the device to facilitate alignment of the annular ring to the sealing surface thereon. The tabs may also retain the face seal gasket adjacent the sealing surface to facilitate improved installation of the device to the pipeline.

7 Claims, 5 Drawing Sheets

FACE SEAL GASKET

CROSS REFERENCE PARAGRAPH

This application claims priority to U.S. Application No. 61/186,198, filed Jun. 11, 2009, which is hereby incorporated herein in its entirety by reference.

BACKGROUND OF THE INVENTION

1. Field of the Invention

The present invention relates to apparatuses and methods for attaching a device to a pipeline. More specifically, but not exclusively, embodiments of the invention relate to face seal gaskets and methods of use for facilitating attachment of a meter or other device to a pipeline.

2. Description of Related Art

In geographical areas where the prevailing temperature may be below freezing a substantial portion of the year, pipelines carrying liquid, particularly water pipelines, are laid a sufficient depth below the earth's surface to prevent freezing of the liquid carried by the pipelines. In practice, such pipelines may be laid as much as ten feet below ground level. In areas less prone to below freezing temperatures, pipelines may still be laid underground to minimize damage and/or interference with other structures such as roads.

In order to monitor liquid flow within the underground pipelines, flow meters are often coupled to the pipeline at selected locations. For example, a meter may be installed in the pipeline leading from a water main to a residential, commercial, or industrial user. Access to the meter is often provided through the use of a lined meter pit provided at selected locations so that access to the meter can be had from ground level. The water meters are connected to the pipeline via an inlet and an outlet. Often, a face seal gasket such as a rubber or copper washer is positioned between the water meter inlet/outlet and the respective pipeline fittings to provide a seal against leaks.

When installing a water meter with a face seal gasket, it can be difficult to properly position the face seal gasket in alignment with the fitting and the inlet/outlet while simultaneously tightening the fitting against the inlet/outlet. This is further complicated when the installation is done within a meter pit due to space constraints. Thus, apparatuses having improved face seal gaskets and installation methods thereof are needed.

SUMMARY OF THE INVENTION

Various embodiments of the present invention provide improved face seal gaskets for use in connecting meters and other devices to pipelines. In one aspect of the invention, a sealing system is provided. The sealing system includes a device having an inlet defining a planar inlet sealing surface and a bore extending therefrom configured to be in fluid communication with a pipeline, and where the inlet has at least one groove formed proximate the inlet sealing surface that extends perpendicularly therefrom. The sealing system also includes a gasket having an annular ring portion that defines a planar gasket sealing surface and at least one tab extending substantially perpendicularly with respect to the gasket sealing surface and having a complementary shape to the at least one groove, where the gasket sealing surface is configured to be disposed adjacent the inlet sealing surface and the at least one tab is configured to engage the at least one groove.

In another aspect of the invention a resilient gasket is provided. The gasket is configured to provide a fluid tight seal against a planar surface, where the gasket comprises a substantially planar annular ring portion. The gasket also includes a plurality of tabs disposed proximate the periphery of the annular ring portion that extends substantially perpendicular to the planar annular ring portion.

In a further aspect of the invention, a water meter is provided. The water meter includes a top cover defining an interior cavity shaped to accept a metering device, where the top cover further defines an inlet and an outlet which are in communication with the interior cavity. At least one of the inlet or the outlet defines a planar sealing surface and an annular flange having a groove formed therein. The water meter also includes a metering device disposed in the interior cavity; a bottom cover engaging the top cover and enclosing the metering device within the interior cavity; and a gasket having an annular ring portion and a tab. The tab is configured to engage the groove formed in the annular flange portion when the annular ring portion is disposed adjacent the sealing surface.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Various embodiments of the present invention provide improved systems for connecting meters and other devices to pipelines. The systems include improved face seal gaskets having a planar annular ring portion and one or more tabs extending substantially perpendicularly from the annular ring portion. In use, the annular ring portion is disposed adjacent a sealing surface on the inlet or outlet of a device to facilitate a fluid tight connection between the device and the pipeline. The tabs engage complementary grooves formed in the inlet or outlet portions of the device to facilitate alignment of the annular ring to the sealing surface thereon. The tabs may also retain the face seal gasket adjacent the sealing surface to facilitate improved installation of the device to the pipeline.

For ease of understanding, various aspects of the present invention will be described in the context of a plastic water meter. However, it should be understood that various aspects of the present invention may be used in conjunction with any type of water meter, device, or fitting where a fluid tight seal to a pipeline is desired.

Figure 1:
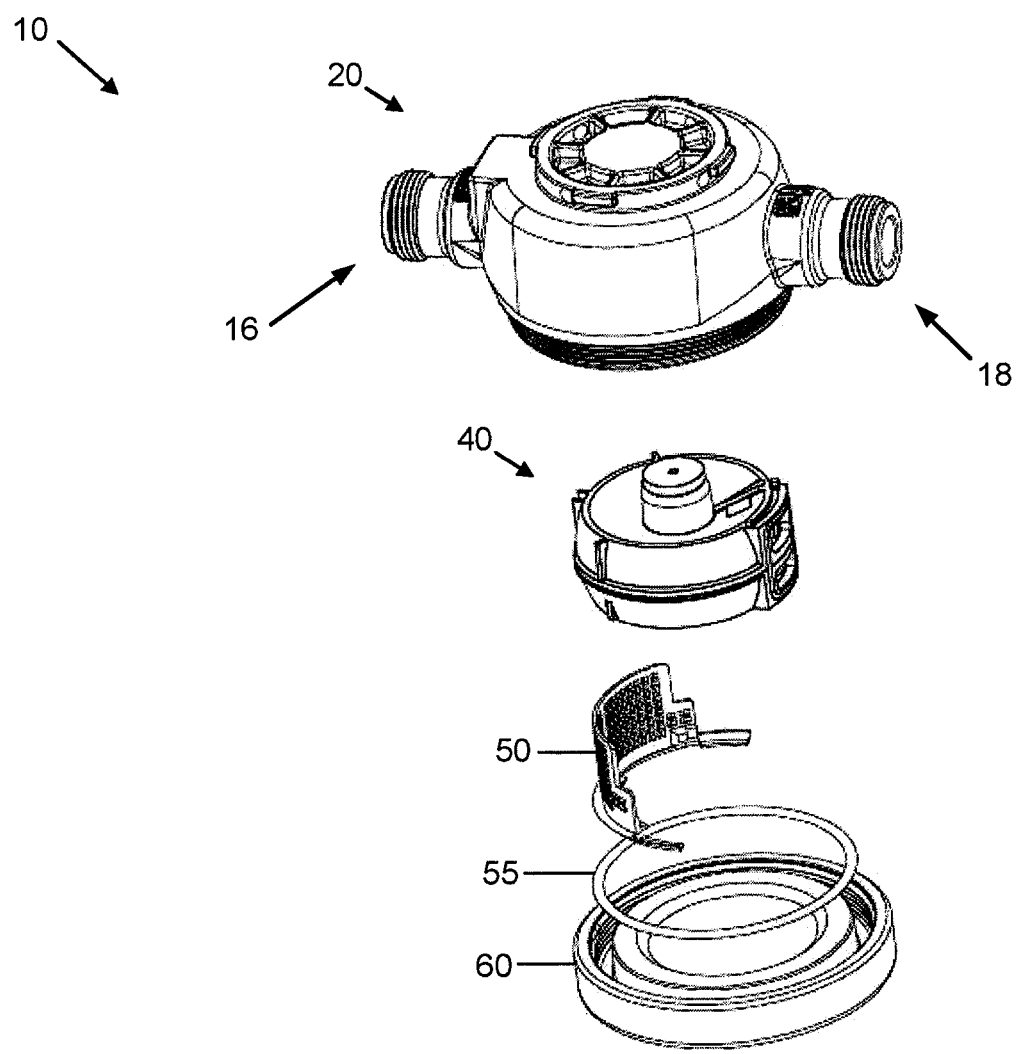
FIG. 1 is an exploded view of a plastic water meter 10 according to one embodiment of the present invention.

FIG. 1 illustrates a plastic water meter 10 according to an embodiment of the present invention. This embodiment includes a water meter housing assembly 20 that may enclose a metering device 40 and a strainer 50. The metering device 40 and the strainer 50 are positioned inside the housing assembly 20. A bottom cover 60 and an o-ring 55 enclose the metering device 40 and the strainer 50 within the housing assembly 20.

Figure 2:
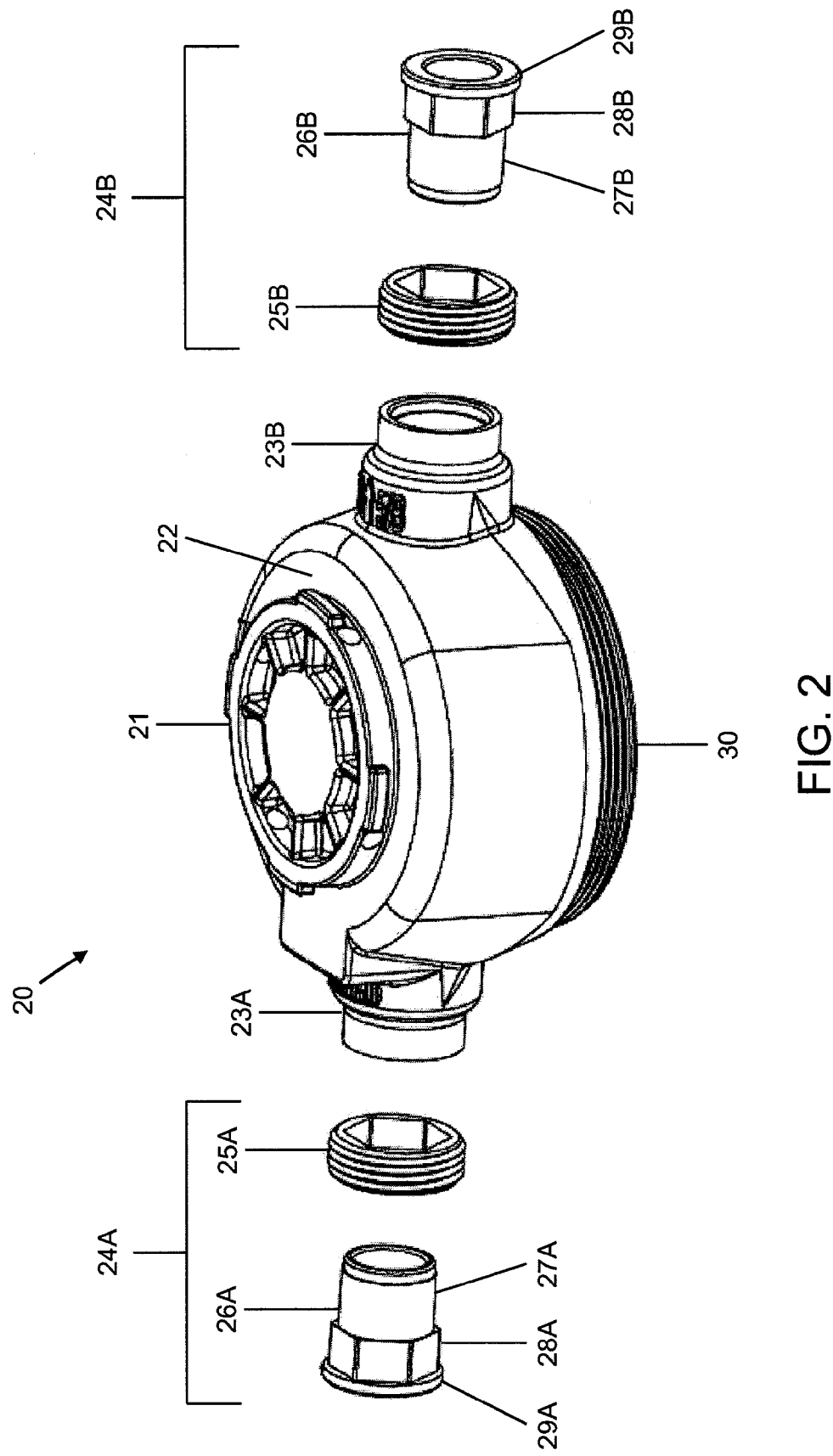
FIG. 2 is an exploded view of the housing assembly 20 shown in FIG. 1.
Figure 3:
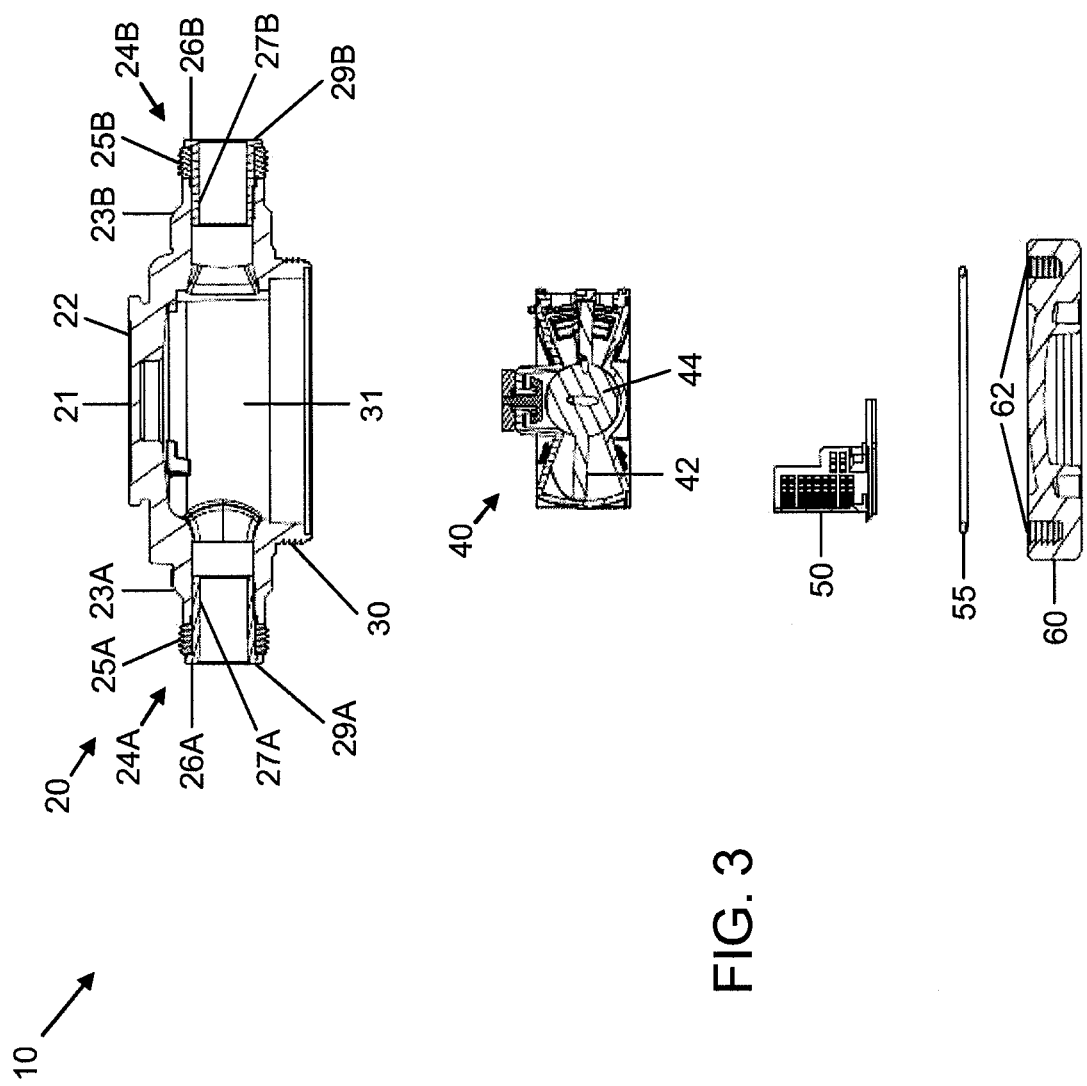
FIG. 3 is an exploded, cross-section view of a plastic water meter 10 according to one embodiment of the invention.

Referring also to FIGS. 2 and 3, the housing assembly 20 in the illustrated embodiment includes a top cover 21 and two connector assemblies 24A,B. Each connector assembly 24A,B includes a plastic spud insert 26A,B and a metal ring 25A,B. One connector assembly functions as an inlet connector assembly 24A and the other connector assembly functions as an outlet connector assembly 24B. The top cover 21, in the illustrate embodiment, includes an integrated inlet spud 23A and an integrated outlet spud 23B. In the illustrated embodiment, the inlet spud 23A and a corresponding connector assembly 26A combine to form the meter inlet 16. Likewise, the outlet spud 23B and a corresponding connector assembly 24B combine to form the meter outlet 18.

In various embodiments, the top cover 21 and the two spud inserts 26A,B may be made from various types of plastic or high-strength polymer materials, including styrene, polystyrene, nylon, or the like. In a preferred embodiment, the top cover 21 and the two spud inserts 26A,B may be composed of glass reinforced thermoplastic. Factors that may be considered when selecting a material include working pressures of the meter, and working temperature ranges.

In the illustrated embodiment, the top cover 21 is substantially cylindrical in shape with an integrated top face portion 22, although those skilled in the art will recognize that the top cover 21 may take other shapes. The bottom of the top cover 21 remains open, thus forming an aperture that leads to the interior cavity 31 of the top cover 21.

Proximate the bottom of the top cover 21 are external threads 30, which enable the bottom cover 60 to engage to the top cover 21. In use, the top cover may flex outwards because of pressure in the system thereby causing the internal threads in the top cover to be urged against the complementary threads on the bottom cover. In other embodiments, the top cover may include internal threads designed to engage external threads on the bottom cover.

One advantage of the external bottom threads 30 provided in various embodiments of the present invention is that external bottom threads 30 are easier to manufacture than internal bottom threads. As will be understood by those skilled in the art, forming internal threads requires an insert mold, while forming external threads does not. In some cases, an additional manufacturing step may be required to remove the internal thread mold insert, which may reduce the efficiency of the molding process.

In the illustrated embodiment, the top cover 21 includes an integrated inlet spud 23A, through which water enters the interior cavity 31 defined by the top cover 21, and an integrated outlet spud 23B, through which water exits the top cover 21. The inlet spud 23A and outlet spud 23B are in communication with the interior cavity 31 of the top cover 21. In various embodiments, the inlet spud 23A and the outlet spud 23B are designed to receive and engage a portion of the spud inserts 26A,B.

In the illustrated embodiment, both the inlet spud 23A and the outlet spud 23B protrude perpendicularly from the exterior of the top cover 21, with the outlet spud 23B situated approximately 180 degrees around the exterior of the top cover 21 from the inlet spud 23A. As will be understood by those of skill in the art, the inlet spud 23A and outlet spud 23B may have a relative orientation other than 180 degrees. Moreover, the inlet and outlet spuds may protrude at angles other than substantially perpendicularly.

In various embodiments, the spuds 23A,B are similar to each other and have a substantially cylindrical shape. Each spud 23A,B defines an axial bore with a proximate orifice that opens through the wall of the top cover 21 into the interior cavity 31 of the top cover 21 and a distal orifice that opens away from the top cover 21. The proximate orifice and distal orifice of each spud 23A,B are substantially circular in shape. In alternative embodiments of the present invention, each spud 23A,B, may not protrude from the exterior of the top cover 21, but may instead be an orifice in the exterior of the top cover 21.

In various embodiments, the bores defined by the inlet spud 23A and the outlet spud 23B are each sized to receive a spud insert 26A,B respectively, and each spud insert 26A,B includes an externally threaded metal ring 25A,B. A purpose of the threaded metal rings 25A,B is to facilitate connection of the water meter to a water system, which generally utilizes metal threads for the connection to the water meter. In various embodiments, the spud inserts 26A,B may be substantially cylindrical in shape with a bore formed therein to allow the passage of water.

In the illustrated embodiment, each spud insert 26A,B includes a first end proximate to the top cover 21 and a second end distal the top cover 21. Proximate the second end of each spud insert 26A,B is an annular flange portion or rim 29A,B that extends outwardly. In various embodiments, the flange 29A,B includes a surface co-planar with a planar, annular sealing surface formed on the second end of the spud insert 26A,B.

Figure 4:
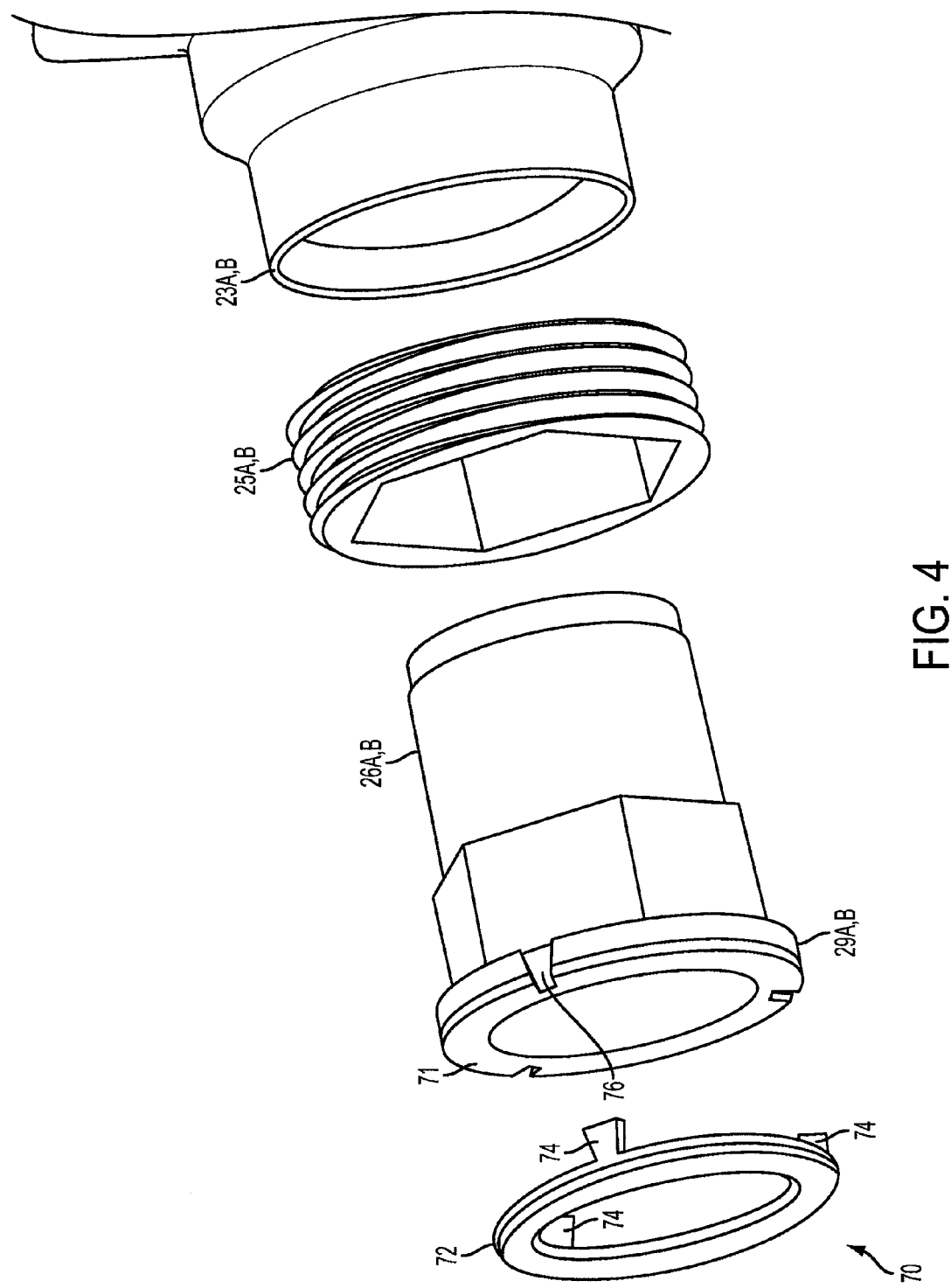
FIG. 4 is an exploded view of a gasket 70 and spud insert in accordance with an embodiment of the present invention.

FIG. 4 is an exploded view of the spud insert 26 A,B and a face seal gasket 70 configured to engage the spud insert 26A,B. In various embodiments, the face seal gasket 70 may be injection molded from a resilient material such as rubber, EPDM, buna, silicone or other resilient material. In the illustrated embodiment, the face seal gasket 70 includes a substantially planar annular ring portion 72 with a plurality of tabs 74 disposed proximate the periphery of the annular ring portion 72. The tabs 74 have a truncated triangular shape and are oriented substantially perpendicular to the plane formed by the annular ring portion 72. In other embodiments, the tabs may have other shapes such as square, rectangle, parallelogram, octagonal or other desired shape.

In the illustrated embodiment, the spud inserts 26A,B include grooves 76 formed in the periphery of the annular flange 29A,B. These grooves 76 have complementary shapes to the tabs 74 formed on the gasket 70. In various embodiments, the tabs 74 and the grooves 76 have a "dovetail" engagement such that when engaged, the face seal gasket is held in place against the annular sealing surface 71. Various other embodiments may use different complementary shapes.

As noted above, the tabs in the illustrated embodiment are located on the periphery of the annular ring portion 72 and the groove 76 is formed in the annular flange 29A,B, which extends outwardly. In other embodiments, the tabs may be formed on the inner circumference of the annular ring 72 with complementary grooves formed on the inner surface of the bore of the spud inserts 26A,B. In further embodiments, the tabs/grooves are formed on both areas (e.g., inside and outside).

The illustrated embodiment includes three tabs 74 formed on the gasket 70 and three complementary grooves 76 formed in the spud 26A,B; however, other embodiments may have more or less tab/groove combinations. Additionally, the tabs and grooves in the illustrated embodiment are evenly spaced around the periphery of the gasket 70, but in other embodiments the spacing of the tabs may be asymmetrical.

Figure 5:
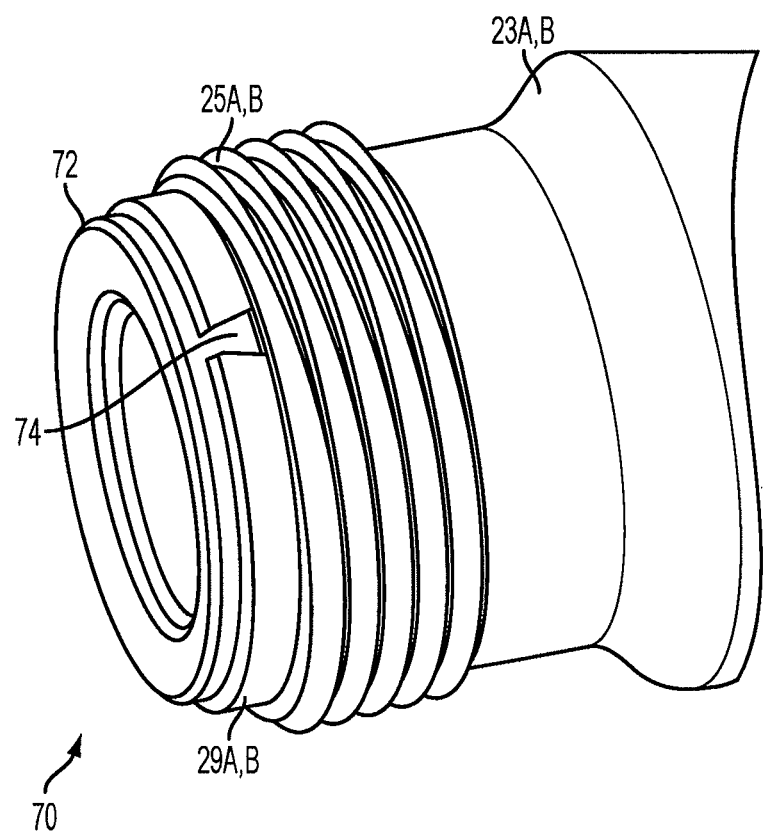
FIG. 5 is a drawing illustrating the gasket 70 engaging a spud insert in accordance with an embodiment of the present invention.

FIG. 5 illustrates a gasket 70 seated on a spud insert 29A,B. The annular ring portion 72 of the gasket 70 is disposed on the substantially planar end surface of the spud insert 26A,B and the tabs 74 engage the complementary grooves formed in the spud insert 26A,B.

A benefit of various embodiments of the tabbed gasket is that the tabs aid in aligning the gasket with respect to the spud insert. Additionally, the engagement of the tabs with the spud insert may retain the gasket against the sealing surface 71 while the installer aligns the meter with the pipeline fitting during installation.

Returning to FIGS. 2 and 3, the threaded metal rings 25A,B are disposed proximate the annular flange portion 29A,B on the spud insert 26A,B. In addition to providing a sealing surface, the annular flange portion 29A,B may also aid in positioning the threaded metal ring 25A,B on the spud insert 26A,B and discourage removal of the threaded metal ring 25A,B when the spud insert 26A,B engages the top cover 21, as will be discussed in greater detail later. In various embodiments, the spud insert 26A,B includes a collar portion 28A,B proximate the flange portion 29A,B. The collar portion 28A,B may be shaped to engage a complementary shaped profile of the inner surface of the threaded metal ring 25A,B to discourage relative rotation between the threaded metal ring 25A,B and the spud insert 26A,B. In the illustrated embodiment, the collar portion 28A,B includes a hexagonal circumferential profile. In various embodiments, the circumferential profile of the collar portion 28A,B may define a shape having at least one linear section or facet. In other embodiments, the circumferential profile of the collar portion 28A,B may define a shape having a plurality of linear sections. In such embodiments, the circumferential profile may take the shape of, for example, a triangle, square, pentagon, hexagon, or octagon. In even more embodiments, the circumferential profile of the collar portion 28A,B may be substantially oval. In further embodiments, inner surface of the threaded metal ring 25A,B may engage the collar portion 28A,B by a key-fit arrangement.

Extending from the collar 28A,B of each spud insert 26A,B is an engagement portion 27A,B. This engagement portion 27A,B may have a cylindrical shape and may be sized to be positioned within the axial bore of a spud 23A,B. The orifice proximate the engagement portion 27A,B of each spud insert 26A,B may be substantially circular in shape and may be substantially perpendicular to each cylindrically-shaped spud insert 26A,B. In various embodiments, the exterior diameter of the engagement portion 27A,B of each spud insert 26A,B is substantially similar to the interior diameter of the axial bore of each spud 23A,B. Thus, the engagement portion 27A,B of each spud insert 26A,B fits snugly into its associated spud 23A,B. In some embodiments, there may be a mild interference fit. The spud insert 26A,B may be secured to the respective spud 23A,B using spin welding, solvent welding, sonic welding, or an adhesive. An advantage of this arrangement is that the metal threads do not contact the water supply and therefore do not impact the zero lead content requirements present in many jurisdiction.

The threaded metal ring 25A,B may be made from various types of metals or metal alloys, including brass, bronze, brass or bronze derivatives, stainless steel, or other similar metal materials. In a preferred embodiment, the threaded metal ring 25A,B is made of bronze. Factors that may be considered when selecting a material for the threaded metal ring 25A,B include material strength and corrosion resistance.

In alternative embodiments, the top cover 21 may include one spud or may include more than two spuds, in accordance with the present invention. In such embodiments, each spud would be similar in construction to the spuds disclosed above and would be shaped to engage a spud insert that may include a metal threaded ring, in accordance with the above disclosure.

In various embodiments, the metering device 40 may be a nutating disk displacement flow meter, wobble plate meter, or other metering device known in the art. In the illustrated embodiment, the metering device 40 includes an inlet through which water enters the metering device 40 and an outlet through which water exits the metering device 40. Referring to FIG. 3, the metering device 40 includes a nutating disk 42 mounted on a sphere 44 that is "wobbled" by the fluid flow where each "wobble" represents a finite amount of fluid transferred. It should be understood that other types of metering devices may be used in connection with the present invention.

The strainer 50 may be semi-cylindrical in shape and may be designed to be disposed between the inlet spud of the top cover 21 and the inlet of the metering device 40. The strainer 50 may be designed to strain foreign objects from the water before the water enters the metering device 40.

In the illustrated embodiment, the metering device 40 and the strainer 50 are disposed inside the top cover 21 and the bottom cover 60 encloses them within the top cover 21. In various embodiments, the bottom cover 60 may be circular in shape with a top face configured to be positioned proximate to the top cover 21 and a bottom face distal to the top cover 21. The top face of the bottom cover 60 may include a substantially annular channel shaped and sized to engage the bottom end of the top cover 21. In particular, the width of the channel may be substantially similar to thickness of the wall of the bottom end of the top cover 21. The exterior wall of the channel may include threads that are configured to engage the external bottom threads 30 of the top cover 21 to enclose the metering device 40 and the strainer 50 within the interior cavity 31 of the top cover 21.

The bottom cover 60 may be made from various types of plastic or high-strength polymer materials, including styrene, polystyrene, nylon, or the like. In a preferred embodiment, the bottom cover 60 may be composed of glass reinforced thermoplastic. Factors that may be considered when selecting a material include working pressures of the meter, and working temperature ranges.

The o-ring 55 may be positioned in the channel to provide a seal between the top cover 21 and the cover 60. In the illustrated embodiment, the cross section of the o-ring is circular; however, other o-ring profiles may be used in connection with embodiments of the present invention.

Many modifications and other embodiments of the inventions set forth herein will come to mind to one skilled in the art to which these inventions pertain having the benefit of the teachings presented in the foregoing descriptions and the associated drawings. For example, the face seal gasket having one or more tabs may be used in connection with any type of pipe fitting or device having a planar sealing surface with grooves having shapes complementary to the tabs formed substantially perpendicular to the sealing surface. Although various embodiments have been described as including a plastic water meter with separate connection assemblies, it should be understood that other embodiments may include meters or devices with integral inlets/outlets having similar shapes. For example, a face seal gasket with tabs according to various embodiments may be used in conjunction with a metal water meter that includes an integral inlet and/or outlet that defines a bore, a planar sealing surface, a groove, and a set of threads.

Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A sealing system comprising:
   a device having an inlet defining a planar inlet sealing surface and a bore extending therefrom configured to be in fluid communication with a pipeline, and wherein the inlet has at least one groove formed proximate the inlet sealing surface that extends perpendicularly therefrom; and
   a gasket having an annular ring portion that defines a planar gasket fluid sealing surface and at least one tab extending substantially perpendicularly with respect to the gasket fluid sealing surface and having a complementary shape to the at least one groove,
   wherein the gasket fluid sealing surface is configured to be disposed adjacent the inlet sealing surface and the at least one tab is configured to engage the at least one groove, and wherein the inlet further comprises a threaded section substantially concentric with the bore and the at least one groove is disposed intermediate the threaded section and the inlet sealing surface.

2. The sealing system of claim 1, wherein the inlet defines a flange formed proximate the outer periphery of the inlet sealing surface and extending outwardly, and wherein the groove is formed in the flange.

3. The sealing system of claim 2 wherein the flange includes a circumferential surface and said groove is located in said circumferential surface and wherein said tab is recessed compared to the circumferential surface of the flange when the tab is engaged in said groove.

4. The sealing system of claim 1, wherein the groove is formed proximate the outer periphery of the inlet sealing surface.

5. The sealing system of claim 1, wherein the bore is cylindrically shaped.

6. The sealing system of claim 1, wherein the at least one tab has a truncated triangular shape.

7. The sealing system of claim 1, wherein the gasket is formed of EPDM, buna, or silicone.

\* \* \* \* \*